United States Patent [19]
Lee

[11] Patent Number: 5,909,967
[45] Date of Patent: Jun. 8, 1999

[54] BEARING ENGAGEMENT STRUCTURE FOR HERMETIC COMPRESSOR

[75] Inventor: Byeong Gyu Lee, Changwon, Rep. of Korea

[73] Assignee: LG Electronics Inc., Rep. of Korea

[21] Appl. No.: 08/968,936

[22] Filed: Nov. 12, 1997

[51] Int. Cl.⁶ ................................................ F16C 33/02
[52] U.S. Cl. ........................................ 384/295; 384/439
[58] Field of Search .................................... 384/295, 296, 384/416, 428, 438, 439, 440; 417/569

[56] References Cited

U.S. PATENT DOCUMENTS

| | | | |
|---|---|---|---|
| 1,817,892 | 8/1931 | Claus | 384/295 X |
| 2,970,869 | 2/1961 | Thomas | 384/416 |
| 4,784,499 | 11/1988 | Fukute | 384/439 X |
| 4,810,106 | 3/1989 | Ohike | 384/295 X |
| 5,149,254 | 9/1992 | Riffe | 417/569 |

*Primary Examiner*—Thomas R. Hannon
*Attorney, Agent, or Firm*—Ostrolenk, Faber, Gerb & Soffen, LLP

[57] ABSTRACT

A bearing engagement structure for a hermetic compressor includes a unitary cylinder-frame member having an opening in a central portion thereof, the opening having an internal screw thread formed along an inner periphery thereof, and a journal bearing including an external screw thread formed along an upper outer periphery thereof and a body formed with a polygonal shape in a lower portion thereof. The body of the journal bearing is formed with a circular, square or hexagonal shape. The bearing engagement structure allows the compressor to employ a unitary type connecting rod which is to be engaged to a crank shaft, for thereby obtaining an advantageous strength of the connecting rod with regard to a compressing force and a tension thereof.

4 Claims, 5 Drawing Sheets

5,909,967

BEARING ENGAGEMENT STRUCTURE FOR HERMETIC COMPRESSOR

BACKGROUND OF THE INVENTION

1. Field of the Invention

The present invention relates to a hermetic compressor, and more particularly to an improved bearing engagement structure for a hermetic compressor, which facilitates an assembly/disassembly between a unitary cylinder-frame structure and a journal bearing.

2. Description of the Prior Art

As shown in FIG. 1, a general hermetic compressor includes: a hermetically sealed container 1 having upper and lower shells 1a, 1b; and a motor unit 3 provided in the container 1 and having a stator 3a and a rotor 3b.

A lower end of each of a plurality of support springs 4 is connected at an inner periphery of the lower shell 1b, and an upper end of each of the support springs 4 supports a frame 2.

A crank shaft 5 having an eccentric portion 6 formed at an upper end thereof is heat-fitted into the rotor 3b. A cylinder 7 is connected to an upper portion of the frame 2.

A piston 8 that horizontally shuttles in the cylinder 7 is engaged to the eccentric portion 6 of the crank shaft 5.

A valve plate 9 is attached onto an end portion of the cylinder 7, and a head cover 10 is attached onto the valve plate 9. A suction muffler (not shown) is mounted on a portion of the head cover 10.

With reference to FIG. 2, a conventional cylinder-bearing structure for a hermetic compressor includes the frame 2 having a plurality of holes receiving respective bolts 16 therethrough, and a journal bearing 15 with a plurality of bolt holes (not shown) formed at an upper portion thereof for being engaged through corresponding ones of the frame bolt holes receiving the bolts 16. That is, the frame 2 and the journal bearing 15 are engaged to each other by the plurality of bolts 16.

The composition of a crank shaft and a connecting rod employed with the cylinder-bearing structure will now be described.

As shown in FIG. 3, a sleeve 12 is fixedly inserted within the inner periphery of a big end of a connecting rod 11. A crank shaft pin 3 is inserted into the sleeve 12.

FIG. 4A illustrates a connecting rod formed of two detachable parts 11a, 11b. FIG. 4B shows another type of connecting rod wherein two parts 12a, 12b are engaged to each other by use of engagement members, such as bolts and clips 14.

However, such a conventional cylinder-bearing structure for a hermetic compressor requires a tapping process for forming the engagement holes and a plurality of bolts for fastening the journal bearing 15, thereby disadvantageously increasing the number of parts and the processing steps required.

Also, when the crank shaft and the connecting rod are engaged to the conventional cylinder-bearing structure, there are witnessed several disadvantages as described hereinbelow.

Initially, in the sleeve type cylinder-bearing structure as shown in FIG. 2, because of the use of the sleeve 12, the crank shaft pin 13 should be formed smaller in diameter, thereby weakening the shaft pin 13.

Further, in the case of the detachable connecting rods as shown in FIGS. 3A and 3B, there is required a higher level of precision in the processing steps thereof while demanding otherwise unnecessary additional parts, such as bolts and clips.

Still further, the separable construction of the connecting rod may weaken its strength for transmitting the compression force.

SUMMARY OF THE INVENTION

Accordingly, it is an object of the present invention to provide a bearing engagement structure for a hermetic compressor, which facilitates an assembly/disassembly between a unitary cylinder-frame member and a journal bearing.

To achieve the above-described object, there is provided a bearing engagement structure for a hermetic compressor according to the present invention which includes a unitary cylinder-frame member including an opening in a central portion thereof, the opening having an internal screw thread formed along an inner periphery thereof, and a journal bearing including an external screw thread formed along an upper outer periphery, and with an outer body of a lower portion thereof formed with a cylindrical, square or hexagonal shape.

BRIEF DESCRIPTION OF THE DRAWINGS

The present invention will become better understood with reference to the accompanying drawings which are given only by way of illustration and thus are not limitative he present invention, wherein.

DETAILED DESCRIPTION OF THE INVENTION

With reference to the accompanying drawings, the bearing engagement structure for a hermetic compressor according to the present invention will now be described.

Figure 5:
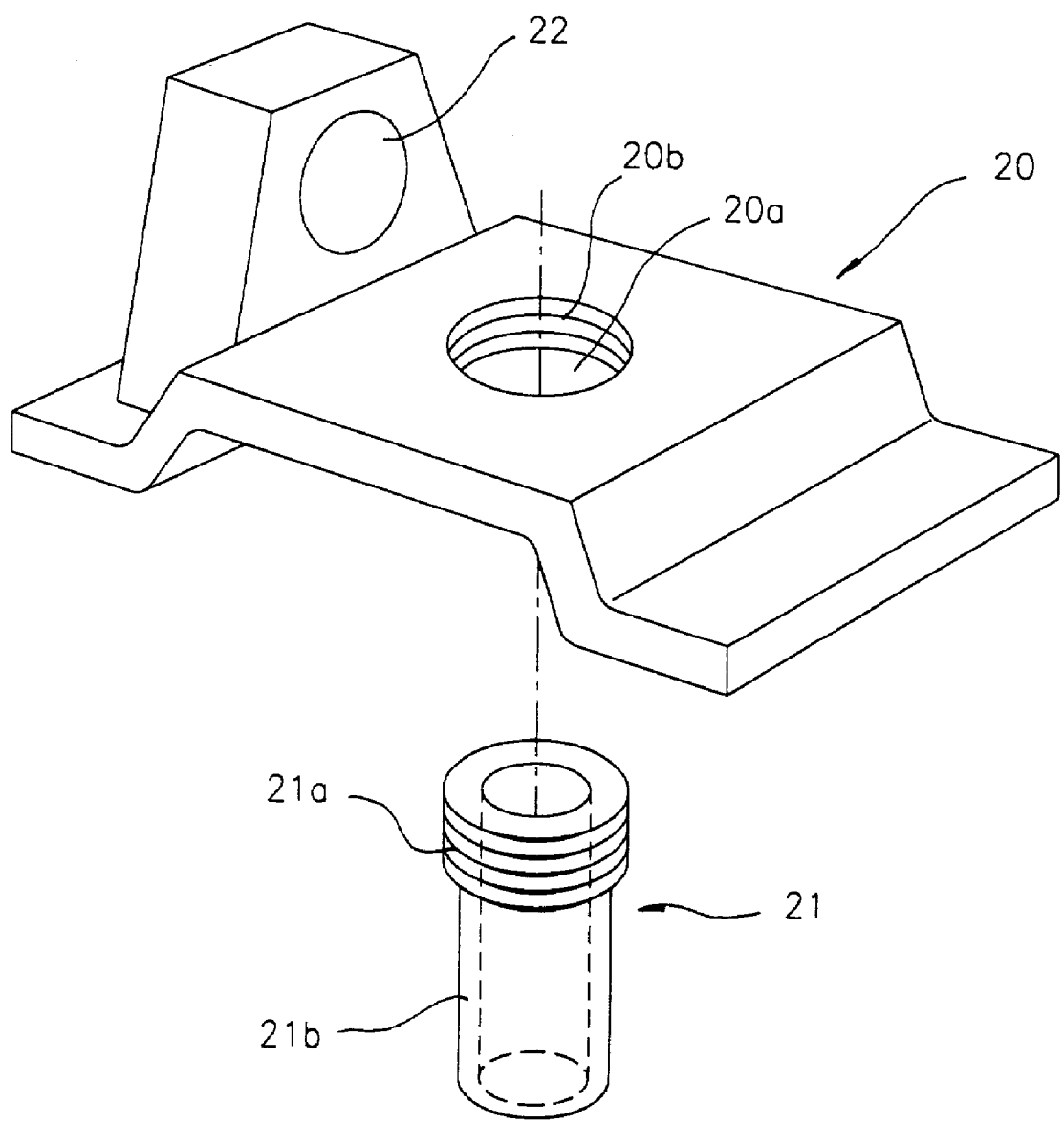
FIG. 5 is an exploded perspective view of a unitary cylinder-frame member and a journal bearing according to the present invention.
Figure 6A:
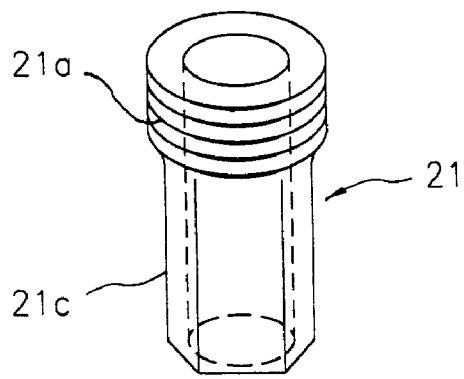
FIG. 6A is a perspective view illustrating a hexagonal-bodied journal bearing according to the present invention.
Figure 6B:
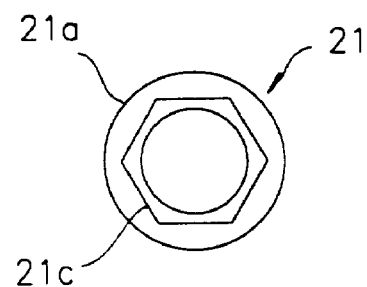
FIG. 6B is a bottom view of the journal bearing shown in FIG. 6A.
Figure 7A:
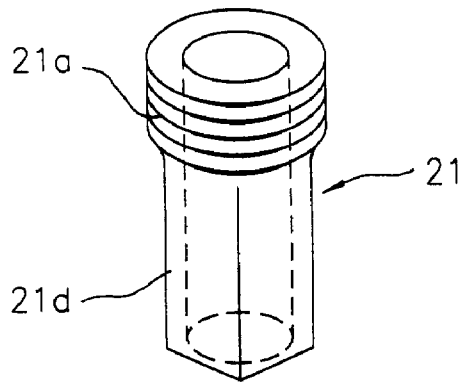
FIG. 7A is a perspective view illustrating a square-bodied type journal bearing according to another embodiment of the present invention.
Figure 7B:
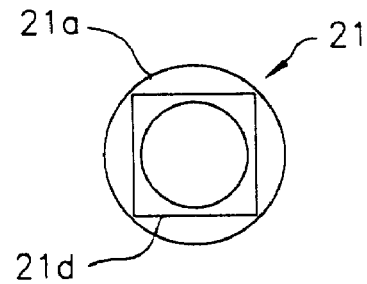
FIG. 7B is a bottom view of the journal bearing shown in FIG. 7A.

As shown in FIG. 5, the bearing engagement structure for a hermetic compressor according to the present invention includes a unitary member having a cylinder portion 22 and a frame portion 20, and a journal bearing 21 that is to be connected into the unitary cylinder-frame member. An opening 20a is formed through a central portion of the unitary cylinder-frame member. The inner periphery of the opening 20*a* is threaded to form an internal screw thread 20*b* thereon, so that an external screw thread 21*a* formed along an upper outer periphery of the journal bearing 21 can be screwed into the internal screw thread 20*b* of the unitary cylinder-frame member.

As shown in FIGS. 5, 6A–6B and 7A–7B, the outer body 21*b* of the lower portion of the journal bearing 21 may be formed with cylindrical, square or hexagonal shape.

The assembly steps of the thusly constituted bearing engagement structure for a hermetic compressor according to the present invention will now be explained.

First, the journal bearing 21 with the external screw thread 21*a* is aligned below the opening 20*a* formed through the cylinder-frame member, and the external screw thread 21*a* of the journal bearing 21 is screwed into the opening 20*a* of the cylinder-frame member; unfastening of the journal bearing 21 from the unitary cylinder-frame member is carried out in reverse order.

Figure 1:
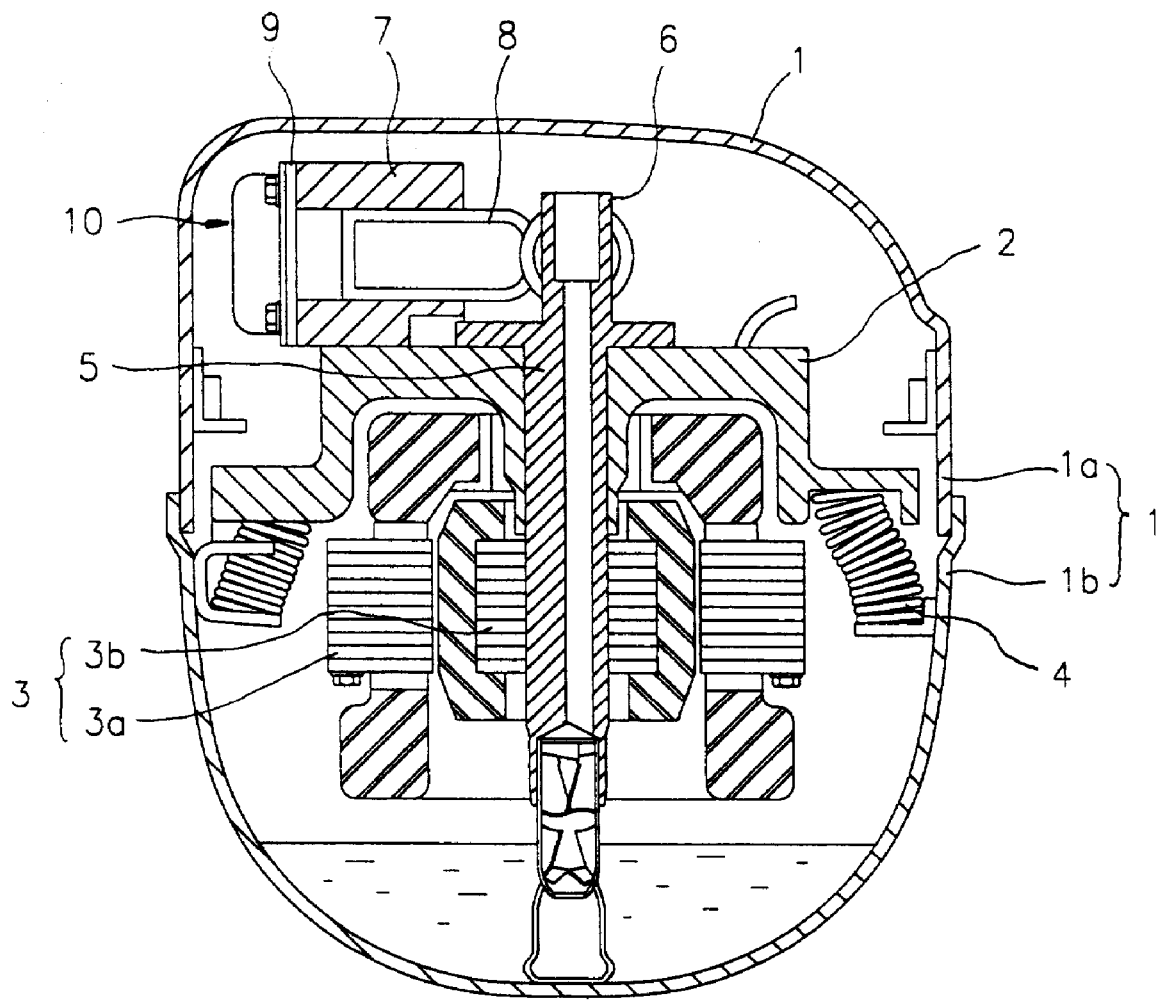
FIG. 1 is a cross-sectional view illustrating a general hermetic compressor.
Figure 2:
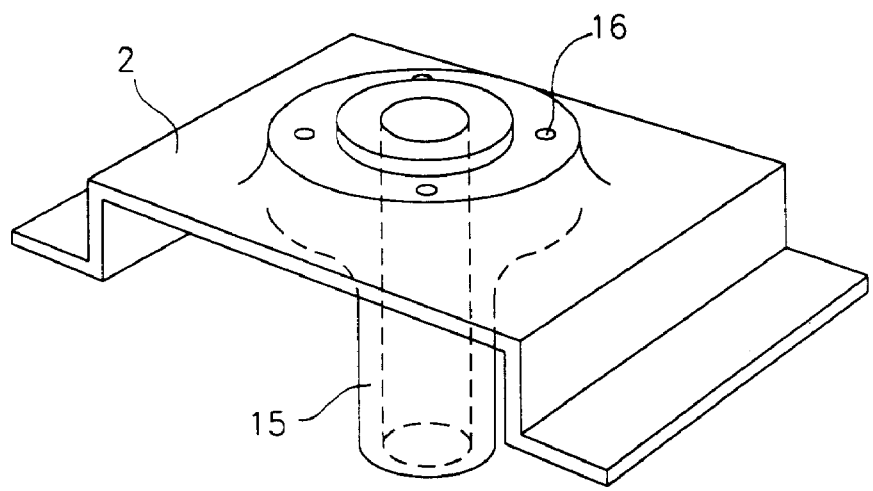
FIG. 2 is a perspective view illustrating the engagement between a frame and a journal bearing in the conventional hermetic compressor.
Figure 3:
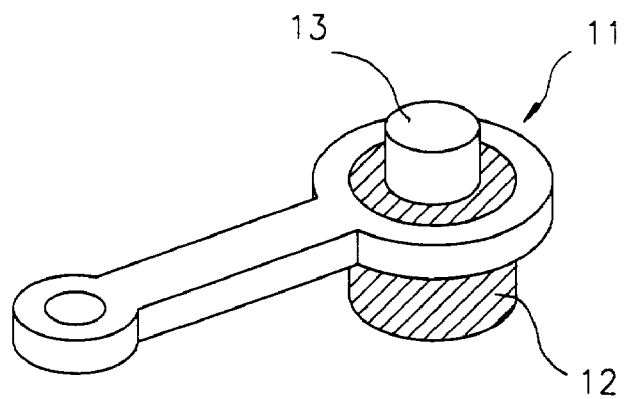
FIG. 3 is a perspective view of a conventional connecting rod structure for the hermetic compressor.
Figure 4A:
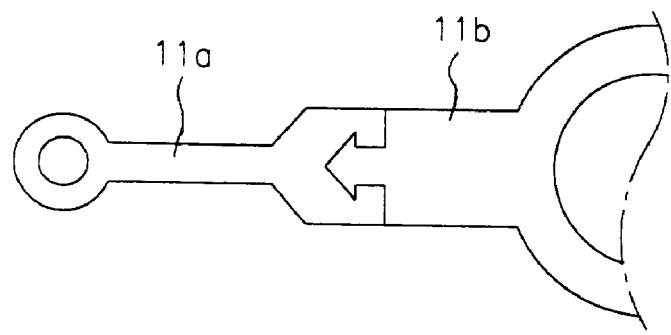
FIG. 4A is a plan view of a detachable connecting rod.
Figure 4B:
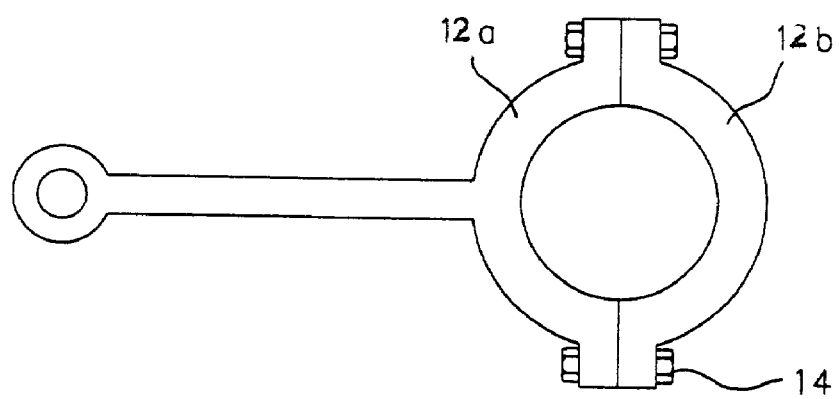
FIG. 4B is a plan view of another detachable connecting rod.

The connection between a crank shaft (not shown), rotor (not shown), and the connecting rod a shown in FIG. 3 will de described.

Initially, the crank shaft (not shown) is fixedly inserted into a hole formed through the journal bearing 21. A lower portion of the inserted crank shaft is heat fitted into a bore formed through a rotor (not shown). The journal bearing 21 is assembled into the unitary cylinder-frame member from below the opening 20*a*.

An end portion of a connecting rod (not shown) is connected to the eccentric portion of the crank shaft (not shown), and another end portion of the connecting rod (not shown) is connected to a piston (not shown).

Specifically, the journal bearing 21 is engaged into the unitary cylinder-frame member and a the same time the piston (not shown) is inserted into the cylinder 22 of the unitary cylinder-frame member.

Also, in addition to the bearing engagement structure according to the present invention, there can be employed a one piece connecting rod.

The bearing engagement structure according to the present invention does not require a bolt taping process or bolts for fastening the journal bearing.

As described above, the bearing engagement structure for a hermetic compressor according to the present invention facilitates an assembly and a disassembly of the journal bearing to the unitary cylinder-frame member provided with the internal screw thread therein and the journal bearing being provided with the external screw thread thereon, thereby improving workability in its assembly.

Further, the baring engagement structure for a hermetic compressor according to the present invention can allow employing a unitary type connecting rod which is to be engaged to the crank shaft, thereby obtaining an advantageous strength of the connecting rod with regard to a compressing force and a tension thereof.

What is claimed is:

1. A bearing engagement structure for a hermetic compressor, comprising:
    a unitary cylinder-frame member including an opening in a central portion thereof, said opening having an internal screw thread formed along an inner periphery thereof; and
    a journal bearing including an external screw thread formed along an upper outer periphery thereof, and a body formed with a polygonal shape in a lower portion thereof.

2. The bearing engagement structure of claim 1, wherein said journal is formed with a circular shape.

3. The bearing engagement structure of claim 1, wherein said journal is formed with a square shape.

4. The bearing engagement structure of claim 1, wherein said journal is formed with a hexagonal shape.

* * * * *